(12) United States Patent
Poehlmann (10) Patent No.: US 10,243,658 B2
(45) Date of Patent: Mar. 26, 2019

(54) METHOD OF RECEIVING A WAVELENGTH DIVISION MULTIPLEXED OPTICAL UPSTREAM SIGNAL IN AN OPTICAL ACCESS NETWORK

(71) Applicant: Alcatel Lucent, Boulogne-Billancourt (FR)

(72) Inventor: Wolfgang Poehlmann, Stuttgart (DE)

(73) Assignee: ALCATEL LUCENT, Boulogne-Billancourt (FR)

( * ) Notice: Subject to any disclaimer, the term of this patent is extended or adjusted under 35 U.S.C. 154(b) by 0 days.

(21) Appl. No.: 15/119,844

(22) PCT Filed: Mar. 10, 2015

(86) PCT No.: PCT/EP2015/054903
§ 371 (c)(1),
(2) Date: Aug. 18, 2016

(87) PCT Pub. No.: WO2015/150028
PCT Pub. Date: Oct. 8, 2015

(65) Prior Publication Data
US 2017/0054504 A1   Feb. 23, 2017

(30) Foreign Application Priority Data
Mar. 31, 2014   (EP) .................................. 14305471

(51) Int. Cl.
*H04B 10/079*   (2013.01)
*H04B 10/572*   (2013.01)
(Continued)

(52) U.S. Cl.
CPC ....... *H04B 10/27* (2013.01); *H04B 10/07955* (2013.01); *H04B 10/07957* (2013.01);
(Continued)

(58) Field of Classification Search
None
See application file for complete search history.

(56) References Cited

U.S. PATENT DOCUMENTS

| 5,729,347 A | 3/1998 | So |
| 6,980,742 B1 * | 12/2005 | Liden ................... H04B 10/506 |
| | | 398/149 |

(Continued)

FOREIGN PATENT DOCUMENTS

| CN | 101034922 A | 9/2007 |
| CN | 101686418 A | 3/2010 |

(Continued)

OTHER PUBLICATIONS

International Search Report PCT/ISA/210 for International Application No. PCT/EP2015/054903 dated Mar. 10, 2015.

(Continued)

*Primary Examiner* — Li Liu
(74) *Attorney, Agent, or Firm* — Harness, Dickey & Pierce, P.L.C.

(57) ABSTRACT

Proposed is a method of receiving a WDM optical upstream signal in an optical access network. The WDM signal is filtered using a first optical filter yielding a first filtered signal. The first optical filter has a flat-top shaped pass-band transfer function. Furthermore the WDM signal is filtered using second optical filter yielding a second filtered signal. The second optical filter has a pass-band transfer function that is strictly monotonically increasing for wavelength values below a center wavelength of the transfer function and that is strictly monotonically decreasing for wavelength values above the center wavelength of the transfer function. Received upstream data is derived from the first filtered signal. An optical signal power level is derived from the second filtered signal an optical signal power level. Finally, (Continued)

it is indicated to an optical network unit a desired direction of wavelength shift in dependence on the derives signal power level.

7 Claims, 6 Drawing Sheets

(51) Int. Cl.
 *H04B 10/27* (2013.01)
 *H04J 14/02* (2006.01)
 *H04B 10/272* (2013.01)
(52) U.S. Cl.
 CPC ......... *H04B 10/272* (2013.01); *H04B 10/572* (2013.01); *H04J 14/025* (2013.01)

(56) References Cited

U.S. PATENT DOCUMENTS

| | | | |
|---|---|---|---|
| 2004/0188600 A1 | 9/2004 | Chapman | |
| 2007/0065076 A1* | 3/2007 | Grek | G02B 6/12016 385/37 |
| 2010/0272394 A1* | 10/2010 | Okamoto | G02B 6/12033 385/37 |
| 2011/0236017 A1* | 9/2011 | Ohlen | H04J 14/0282 398/34 |
| 2012/0128373 A1* | 5/2012 | Smith | H04B 10/503 398/158 |
| 2012/0321299 A1* | 12/2012 | Oguma | H04B 10/07955 398/34 |
| 2013/0251364 A1* | 9/2013 | Pachnicke | H04J 14/0227 398/32 |
| 2013/0336655 A1* | 12/2013 | Grobe | H04J 14/0246 398/67 |
| 2015/0244494 A1* | 8/2015 | Grobe | H04J 14/0278 398/68 |
| 2017/0170898 A1* | 6/2017 | Fu | H04B 10/07957 |

FOREIGN PATENT DOCUMENTS

| | | |
|---|---|---|
| CN | 102075822 A | 5/2011 |
| CN | 102577428 A | 7/2012 |
| CN | 103634066 A | 3/2014 |
| EP | 2675089 A1 | 12/2013 |
| EP | 2680472 A1 | 1/2014 |

OTHER PUBLICATIONS

Written Opinion of the International Searching Authority PCT/ISA/237 for International Application No. PCT/EP2015/054903 dated Mar. 10, 2015.
Chinese Office Action dated Feb. 2, 2018 issued in corresponding Chinese Application No. 201580017342.7.

* cited by examiner

METHOD OF RECEIVING A WAVELENGTH DIVISION MULTIPLEXED OPTICAL UPSTREAM SIGNAL IN AN OPTICAL ACCESS NETWORK

FILED OF THE INVENTION

The invention relates to a method of and an optical line terminal for receiving a wavelength division multiplexed (WDM) upstream signal in an optical access network.

BACKGROUND

For the purpose of connecting a number of customers to a core network to enable data transmission, it is a well known approach to rely on an optical access network in the form of a passive optical network (PON).

In such an optical access network, a customer connects his equipment to an optical network unit, which may be also called an optical network terminal, wherein the optical network units of the access network are connected via optical fibres to a remote node. The remote node in turn is connected via an optical feeder fibre to an optical line terminal (OLT) located in the so called central office. The optical line terminal in turn forms the interconnection to the core network.

In a WDM optical access network, the different optical network units transmit different upstream signals at different respective wavelengths to the remote node, which combines these upstream signals and transmits them via the feeder fibre to the optical line terminal. In The WDM optical access network, each optical network unit transmits its respective upstream signal at a separate, individual wavelength.

The concept of WDM may be extended to the concept of TWDM, wherein the concept of WDM is established in conjunction with the concept of time division multiplex (TDM). In such a TWDM optical access network, two or more optical network units of a same group share a same wavelength for their respective upstream signals, wherein the data transmission in the upstream direction on this same wavelength is split among the group of optical network units via TDM.

Data transmission in the downstream direction from the OLT towards the optical network units takes place, such that an overall downstream signal comprises a number of different downstream wavelengths, preferably four or eight different downstream wavelengths. Each of the downstream wavelengths is preferably split into frames via TDM splitting. Thus, one downstream signal of one downstream wavelength is assigned to a number of optical network units.

At the feeder fibres end, the remote node splits the downstream signal of the downstream wavelengths onto the different fibres leading to the different optical network units by means of power splitting.

At the optical network units, data reception is carried out, in that each optical network unit uses a tunable filter for receiving that downstream signal of that downstream wavelength assigned to the respective optical network unit. Furthermore, in the case that a downstream signal of a specific downstream wavelength is split into frames via TDM splitting, the optical network units selects those data frames that are assigned to the respective network unit.

The optical network units transmit their respective upstream signals in the upstream direction using a form of amplitude modulation called on/off keying. Such on/off keying leads to a broadening of the transmission wavelength, wherein this broadening is not negligible.

For reception of the upstream signals at the OLT, the different upstream signals at the different respective wavelengths are filtered by respective filters with fixed transfer functions. The filters may be provided as a combined optical filter. The respective filtered signals are then provided to respective receivers for deriving from the respective upstream signals respective data streams, which then in turn may be used for further data transmission towards the core network.

Since the different upstream signals with their respective different upstream wavelengths are filtered at the OLT using fixed filter functions in the optical domain, it is a critical aspect, that the optical network units actually transmit their upstream wavelengths at such wavelengths that are assigned to them and at which the respective upstream signals are able to pass through the corresponding optical filters' transfer functions in order to reach a respective designated receiver within the OLT.

An approach to ensure that an optical network unit transmits its upstream signal at the respective assigned proper wavelength is to foresee a tuneable transmitter within the optical network unit, wherein the transmitting wavelength may be monitored by control devices placed within the optical network unit. Such a solution may be cumbersome and expensive.

The document EP 2675089 A1 discloses an optical line terminal, in which an upstream signal is provided to a receiving unit as well as tapped for providing a part of the upstream signal to a control unit, which determines a wavelength of the upstream signal for an iterative wavelength tuning process in which a wavelength of an optical network unit is tuned.

The document US 2004/188600 A1 discloses a periodic filter with filtering ranges having respective peak wavelength for monitoring a wavelength of a tuneable laser system.

The document U.S. Pat. No. 5,729,347 A discloses optical filters that have monotonically increasing filter values for an increased wavelength.

SUMMARY

Proposed is a method of receiving a wavelength-division multiplexed (WDM) optical upstream signal in an optical access network. The method comprised different steps carried out at an optical line terminal.

The WDM optical upstream signal is filtered using a first optical filter yielding a first filtered signal. The first optical filter has a flat-top shaped pass-band transfer function.

Furthermore the WDM optical upstream signal is filters using second optical filter yielding a second filtered signal. The second optical filter has a pass-band transfer function that is strictly monotonically increasing for wavelength values below a center wavelength of the transfer function and that is strictly monotonically decreasing for wavelength values above the center wavelength of the transfer function.

Received upstream data is derived from the first filtered signal.

An optical signal power level is derived from the second filtered signal.

Finally, a desired direction of wavelength shift is indicated to an optical network unit it dependence on the derived signal power level.

Preferably, the transfer function of the first filter and the transfer function of the second filter are essentially equal in their respective center wavelengths.

Preferable, the second filter has a Gaussian shaped transfer function.

Preferably, the optical upstream signal is an overall upstream signal comprising a number of optical upstream signals having respective wavelengths.

Preferably, the optical upstream signals are modulated via amplitude modulation.

Preferably, the amplitude modulation is on-off keying modulation.

Preferably, the steps of
deriving from the second filtered signal an optical signal power level, and
indicating to an optical network unit a desired direction of wavelength shift in dependence on the derived signal power level,
are carried out in a continuous manner for respective successive time intervals.

Preferably, the step of indicating to an optical network unit a desired direction of wavelength shift in dependence on the derived signal power level comprises transmitting via an optical downstream signal a data element that is indicative of the desired direction of wavelength shift.

Proposed is also an optical line terminal for receiving a wavelength-division multiplexed optical upstream signal in an optical access network. The optical line terminal is operable to
filter the WDM optical upstream signal, using a first optical filter yielding a first filtered signal, wherein the first optical filter has a flat-top shaped pass-band transfer function,
filter the WDM optical upstream signal, using a second optical filter yielding a second filtered signal, wherein the second optical filter has a pass-band transfer function that is strictly monotonically increasing for wavelength values below a center wavelength and that is strictly monotonically decreasing for wavelength values above the center wavelength,
derive from the first filtered signal received upstream data, using a data reception unit,
derive from the second filtered signal an optical signal power level, using a power detection unit, and to
indicate to an optical network unit a desired direction of wavelength shift in dependence on the derived signal power level, using a control unit and a transmitter.

Preferably, the optical line terminal is operable to
derive from the second filtered signal the optical signal power level, and to
indicate to the optical network unit the desired direction of wavelength shift in dependence on the derived signal power level,
in a continuous manner for respective successive time intervals, using the power detection unit, the control unit and the transmitter.

Preferably, the optical line terminal is operable to
indicate to the optical network unit the desired direction of wavelength shift in dependence on the derived signal power level,
by transmitting an optical downstream signal containing a data elements that is indicative of the desired direction of wavelength shift, using the control unit and the transmitter.

DESCRIPTION OF EMBODIMENTS

Figure 1:
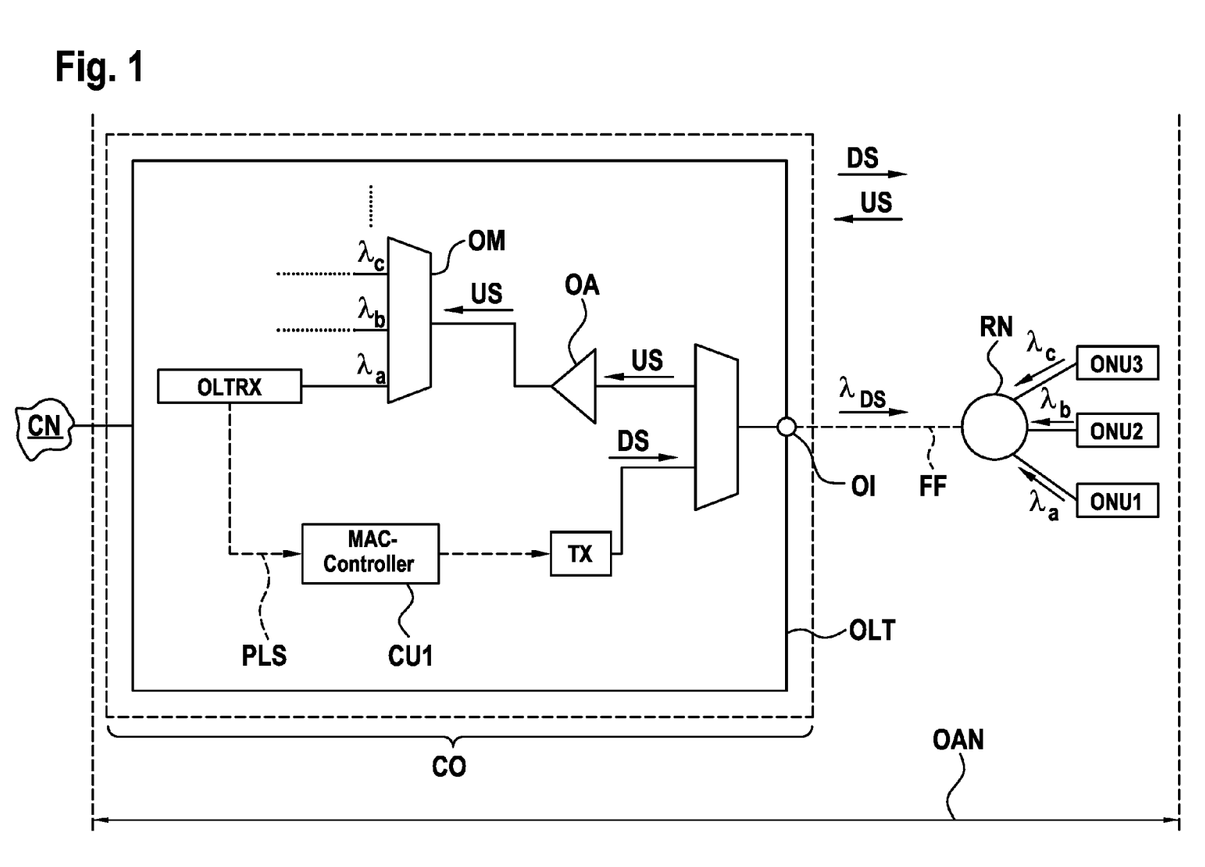
FIG. 1 shows an optical access network.

FIG. 1 shows an optical access network OAN, which connects a number of optical network units ONU1, . . . , ONU3 to a core network CN.

The optical units ONU1, . . . , ONU3 are connected via respective optical fibres to a remote node RN, which is turn is connected via an optical feeder fibre FF to an optical line terminal OLT placed in the central office CO. The optical access network OAN is either of the type WDM or more specifically of the type TWDM. A TWDM optical access network is considered to be a special type of a WDM optical access network. For the purpose of ease of illustration, only the concept of WDM is illustrate in FIG. 1, wherein a person skilled in the art would easily be able to extend the concept of the network OAN shown in FIG. 1 to a TWDM network by foreseeing different optical network units transmitting their respective upstream signals at a same common wavelength in a TDM manner.

The network units ONU1, . . . , ONU3 transmit their upstream wavelengths in the upstream direction US at respective wavelengths $\lambda_a, \ldots, \lambda_c$ assigned to the respective network units. As it will be addressed in more detail later on, the optical network units ONU1, . . . , ONU3 have to be tuned to their respective wavelengths $\lambda_a, \ldots, \lambda_c$.

The remote node RN combines the signals in upstream direction US and transmits them along the feeder fiber FF to the optical interface OI of the OLT.

The line terminal OLT transmits in a WDM manner an overall downstream signal at an overall wavelength set $\lambda_{DS}$ in the downstream direction DS. The overall wavelength set $\lambda_{DS}$ comprises a number of downstream wavelengths, preferably four or eight different downstream wavelengths. Each of the downstream wavelengths is preferably furthermore split into frames via TDM splitting. Thus, one downstream signal of one downstream wavelength is assigned to a number of optical network units.

At the feeder fibre's end, the remote node RN splits the downstream signal of the downstream wavelength set $\lambda_{DS}$ onto the different fibres leading to the different optical network units ONU1, . . . , ONU3 by means of power splitting. At the optical network units, lip data reception is carried out, in that each optical network unit ONU1, . . . , ONU3 uses a tunable filter for receiving that specific downstream signal of that specific downstream wavelength assigned to the respective optical network unit. Furthermore, in the case that a downstream wavelength signal is split into frames via TDM splitting, an optical network unit ONU1, . . . , ONU3 selects those data frames that are assigned to the respective network unit.

In the case, that the network OAN is WDM access network, the upstream signals may lie within a range of preferably 1524 up to 1625 nanometers.

In the case, that the access network OAN is of the type TWDM and specifically of the type NG-PON2, then the upstream signals are preferably within the range of 1524 up to 1544 nanometers, wherein the downstream signal may be within the range of 1596 up to 1603. In a TWDM network, the number of downstream wavelengths is preferably four or eight. Preferably, a number of up to 64 optical network units exist in a network of the type NG-PON2.

At the line terminal OLT, the upstream signals forming an overall upstream signal are provided via an optical multiplexing/demultiplexing device M1 to an optical amplifier OA. This amplifier OA amplifies the upstream signals in order to compensate for an insertion loss of the optical filter M1 and/or an insertion loss of an optical demultiplexing filter OM following the amplifier OA.

The optical filter OM possesses a number of optical transfer functions that filter out respective wavelengths $\lambda_a, \ldots, \lambda_c$. When filtering the overall upstream signal reaching the filter OM, a filtered signal is yielded by filtering the overall upstream signal with a transfer function that corresponds to a center wavelength of $\lambda_a$. The resulting filtered signal is provided to a receiver OLTRX, which is a data reception unit. Further respective filtered signals yielded by the filtering the overall upstream signal within the optical de-multiplexing filter OM may be provided to respective further receivers not explicitly shown in FIG. 1. The receiver OLTRX derives from the filtered signal received upstream data as well as an optical signal power level of the filter signal.

Figure 3:
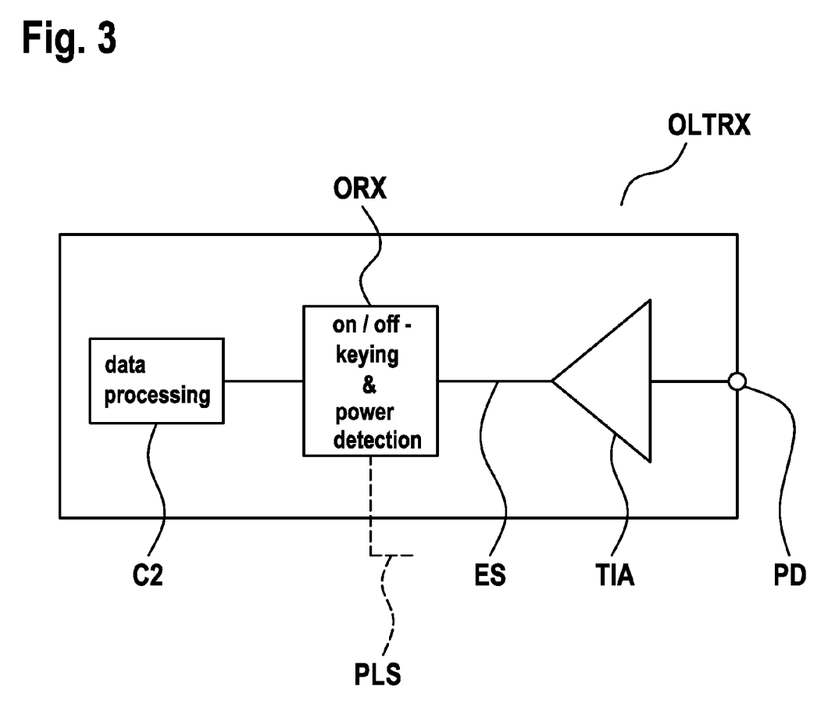
FIG. 3 shows a data reception unit of an optical line terminal according to an embodiment.

The receiver OLTRX of FIG. 1 is now described in more detail in FIG. 3. The receiver OLTRX contains at its input a photodiode PD, which is preferably a PIN diode or an APD diode. The electrical signal provided by the photodiode PD is preferably amplified using a transimpedance amplifier TIA. The resulting electrical signal ES is provided to a reception unit ORX, which performs on/off keying reception for deriving data from the electrical signal ES. The derived data is then provided to a data processing unit C2. Furthermore, the reception unit ORX derives from the electrical signal ES, and thus indirectly from the filtered optical signal reaching the receiver OLTRX, an electrical signal PLS that indicates an optical input power of the optical signal. In other words, the electrical output signal PLS is proportional to the optical input power detected at the receiver OLTRX.

Coming back to FIG. 1, it will now be explained in detail, in which way the signals PLS can be used in order to tune the wavelength of an optical network unit, for example the optical network unit ONU1 with its wavelength $\lambda_a$. The concept considered is one, in which the optical network unit ONU1, as well as the other optical network units shown in FIG. 1, are so called colorless transmitters. Colorless is a term for describing optical transmitters for which its wavelength is determined by tuning mechanism relying on a control signal coming from outside of the optical network unit.

The optical network unit ONU1 contains a transmission laser that can be tuned by means of thermal tuning. Preferably the tuning is carried out by a so called on-chip heater stripe. The laser may be a distributed feedback laser (DFB). For the purpose of tuning, the temperature dependence of the DFB lasers emission wavelength is exploited, wherein temperature tuning may be carried out with a temperature coefficient of approximately 0.08 nanometers per kelvin up to 0.1 nanometers per kelvin. Preferably, in conjunction with the temperature tuning, also a bias current tuning may be applied.

Due to the fact, that although the optical network unit ONU1 of FIG. 1 may be tuned properly to the proper wavelength $\lambda_a$ that is able to pass the corresponding transfer function of the filter OM within the line terminal OLT, the wavelength of the transmitter inside the network unit ONU1 may drift over time for the reason of different effects. Thus, the wavelength received at the receiver OLTRX has to be checked in a continuous manner.

Figure 4A:
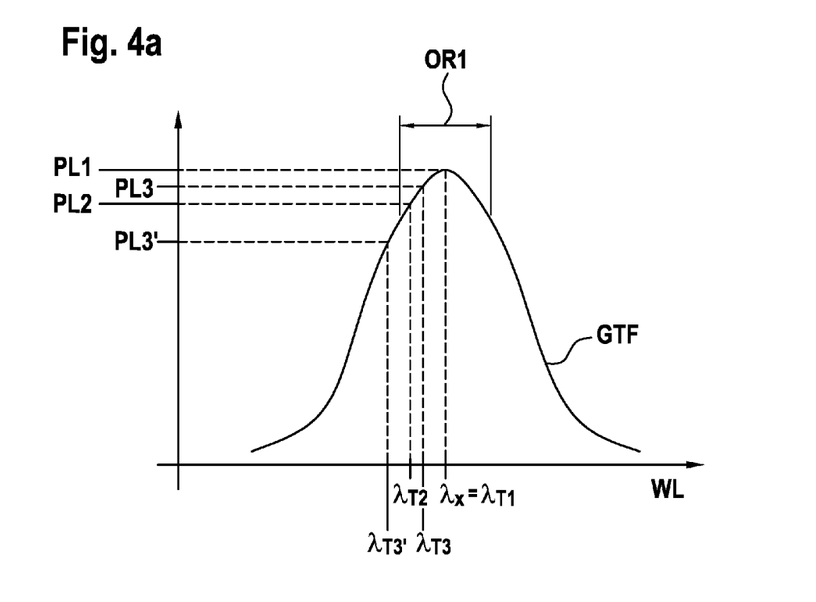
FIG. 4a shows a transfer function of an optical filter that is preferably a Gaussian shaped transfer function.

One may consider a filter with a transfer function GTF as shown in FIG. 4a. The transfer function GTF is a pass-band transfer function that is strictly monotonically increasing for wavelength values below a center wavelength $\lambda_x$ and that is strictly monotonically decreasing for wavelength values above the center wavelength $\lambda_x$.

As an example, the transfer function of FIG. 4a may be a Gaussian shaped transfer function. It may be assumed that the wavelength $\lambda_a$ of the transmitting unit ONU1 of FIG. 1 coincides with the center wavelength $\lambda_x$ of the transfer function GTF in a first time instance T1. At a second time instance T2, the wavelength may have drifted to a wavelength indicated as $\lambda_{T2}$. Thus, when deriving at the receiver OLTRX of FIG. 1 respective power levels PL1 and PL2 for the different time instances T1 and T2, wherein the power levels PL1 and PL2 relate to the transfer functions of the transfer function GTF, it may be detected at the receiver OLTRX, that the wavelength of the transmitting network unit ONU1 has to be tuned.

Coming back to FIG. 1, the electrical signal PLS indicating the optical input power levels detected at the receiver OLTRX is provided to a control unit CU1. The control unit CU1 is a media access control (MAC) unit. This control unit CU1 uses the indicated power levels to decide for a direction a of desired direction of wavelength shift that is to be carried out by the transmitter of the network unit ONU1. The control unit CU1 initiates a transmission of an optical downstream signal at the transmitting device TX. The transmitter TX is coupled via the multiplexing/de-multiplexing filter M1 to the optical interface OI. The downstream signal indicates to the optical network unit ONU1 the desired direction of wavelength shift, wherein the shift is determined in dependence on the signal power levels.

For example, the downstream signal indicates to the optical network unit ONU1 to shift its wavelength to a higher wavelength by a predefined wavelength shift, which is preferably within the range of 0.02 up to 0.05 nanometers. Assuming now, that the transmitting laser of the network unit ONU1 shifts its wavelength to a higher wavelength $\lambda_{T3}$, then an increased optical signal power will be measured within a next following measurement third time interval. This optical signal power relates to the value PL3 indicated in the transfer function GTF. Due to the fact, that the wavelength is shifted in a direction towards a higher frequency resulting in an increased optical power level PL3, the tuning procedure may be continued by furthermore requesting to shift the transmitting wavelength towards an even higher wavelength. In the case, that a requested direction of wavelength shift to a lower wavelength causes a shift to a wavelengths $\lambda_{T3'}$ with a reduced optical power level PL3', then the direction of the wavelength shift may be changed for the next following time instance.

Figure 6:
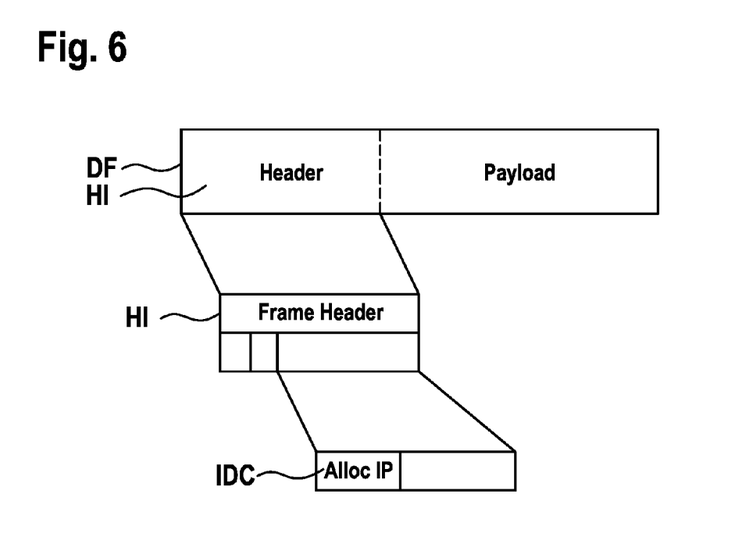
FIG. 6 shows a structure of a data message for indicating to an optical network unit the desired direction of wavelength shift.

The indication of the desired direction of wavelength shift may carried out, by embedding into the downstream signal a data frame that contains data which indicates the direction of the desired direction of wavelength shift together with an identification data identifying the network unit ONU1, of which the wavelength shift is requested. Such a data structure is exemplarily shown in FIG. 6. Within a data frame DF, header information HI may be employed, wherein the identification data IDC, that identifies the optical network unit of which the wavelength shift is requested, is placed in the header HI. Additionally, one or more additional elements or data bits may be placed within the header for indicating the desired direction of wavelength shift. Preferably, also the amount of the requested wavelength shift may be indicated in the data frame DF.

Such an iterative tuning mechanism as described above allows wavelength convergence of the ONU's wavelength to a wavelength equal to or close to the center wavelength $\lambda_x$, since the transfer function GTF shown in FIG. 4a is a strictly monotonically increasing transfer function for wavelength values below the center wavelength $\lambda_x$ and also a strictly monotonically decreasing for wavelength values above the center wavelength $\lambda_x$.

In other words, the optical filter OM used for filtering the overall upstream signal uses transfer functions to the type as described with regard to FIG. 4a, while due to the properties of the shape of the filters' transfer function, a convergence of the transmitting wavelength $\lambda_a$ of the optical network unit ONU to a value approximate to the center wavelength $\lambda_x$ is feasible.

Figure 2:
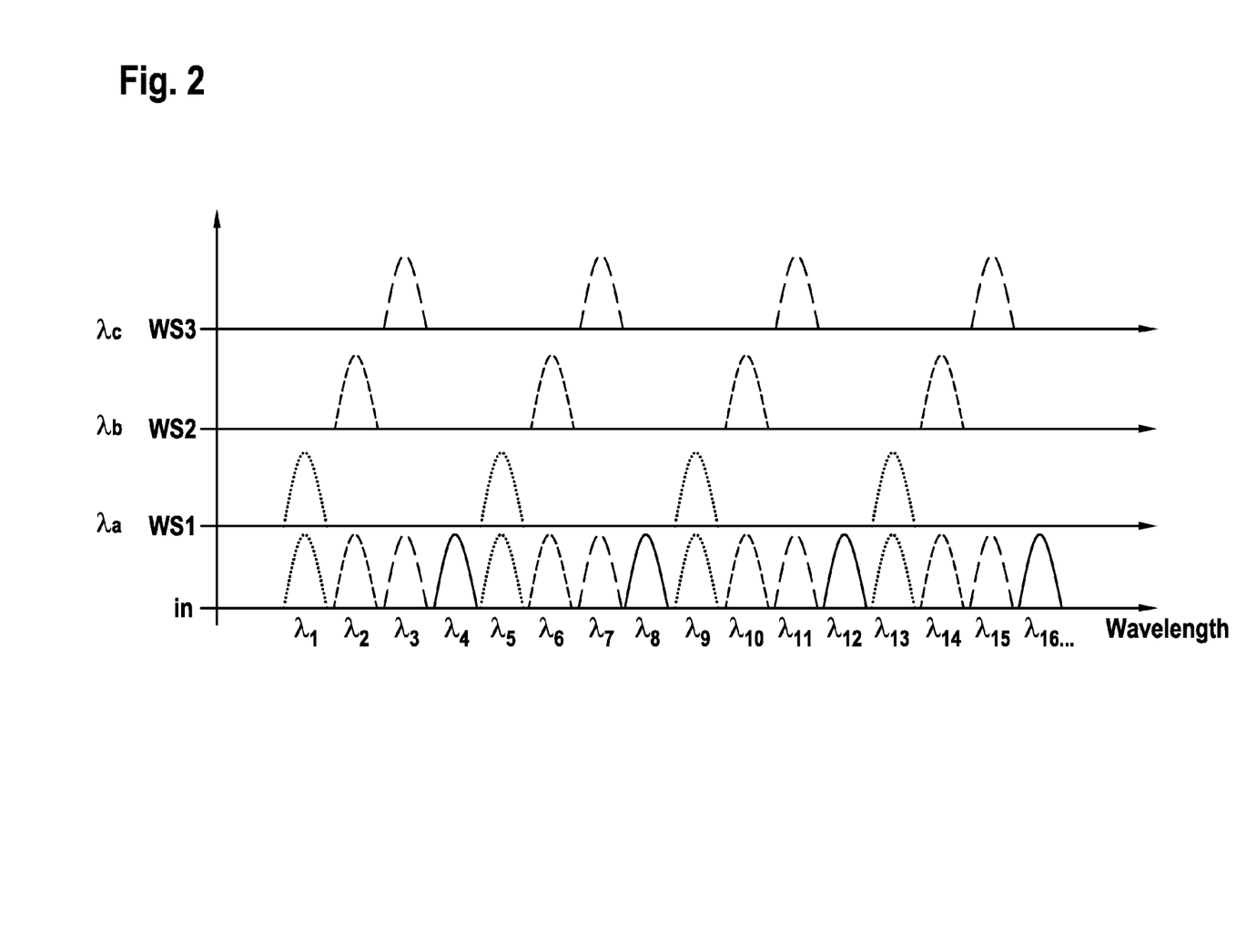
FIG. 2 shows filtering functions of a de-multiplexing filter.

The filter OM is preferably given as an arrayed waveguide grating (AWG). Even more preferable, the filter OM may be a cyclic arrayed waveguide grating, wherein a wavelength, such as the wavelength $\lambda_a$, of an upstream signal may take on a preferred wavelength out of a set of wavelengths. FIG. 2 shows different wavelengths sets WS1, . . . , WS3, which each indicate a respective set of wavelengths to which an optical network unit may be tuned when using a cyclic AWG as the optical filter OM of FIG. 1. For example, the wavelength $\lambda_a$ may be one out of the wavelengths of the set WS1. For example, the wavelength $\lambda_b$ of the network unit ONU2 of FIG. 1 may take on one of the wavelengths out of the wavelength set WS2. For example, the wavelength $\lambda_c$ of the network unit ONU3 of FIG. 1 may take on one of the wavelengths out of the wavelength set WS3. Cyclic tuning using a cyclic AWG is of convenience for choice of its implementation, since this may provide low cross talk and may be designed to demultiplex a high number of wavelength sets. Even furthermore, when considering a wavelength grid of 50 GHz, the DFB laser of an optical network, unit in the worst case need to tune only over 200 GHz to select one out of the four wavelength sets.

Figure 5:
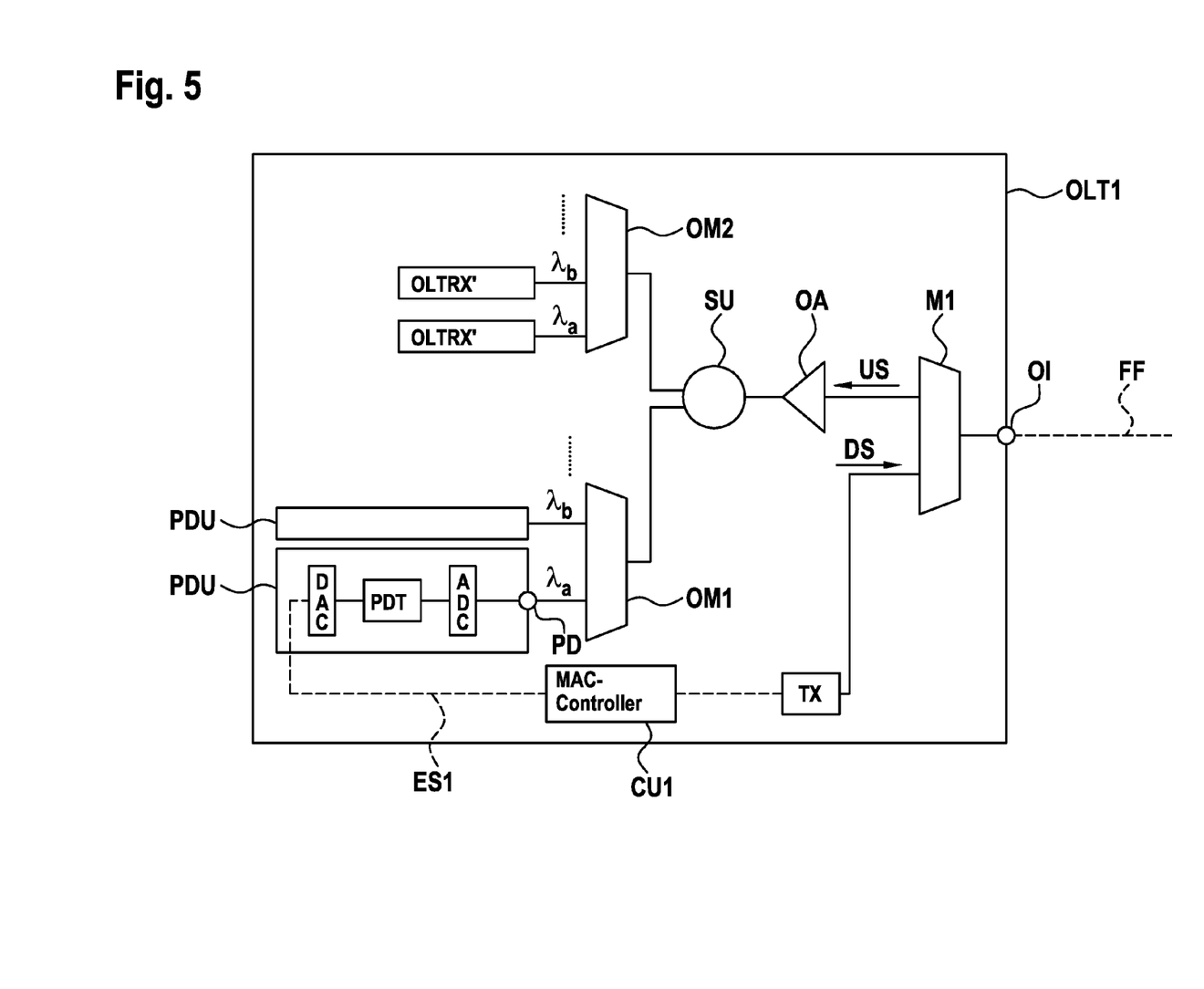
FIG. 5 shows a proposed optical line terminal.

FIG. 5 shows proposed optical line terminal OLT1. The line terminal OLT1 receives at its optical interface OI signals from the feeder fiber FF and transmits signals to the feeder fiber FF. A filter M1 as previously described with regard to FIG. 1 is used for separating the upstream signals and the downstream signals in the upstream direction US and the downstream direction DS.

Figure 4B:
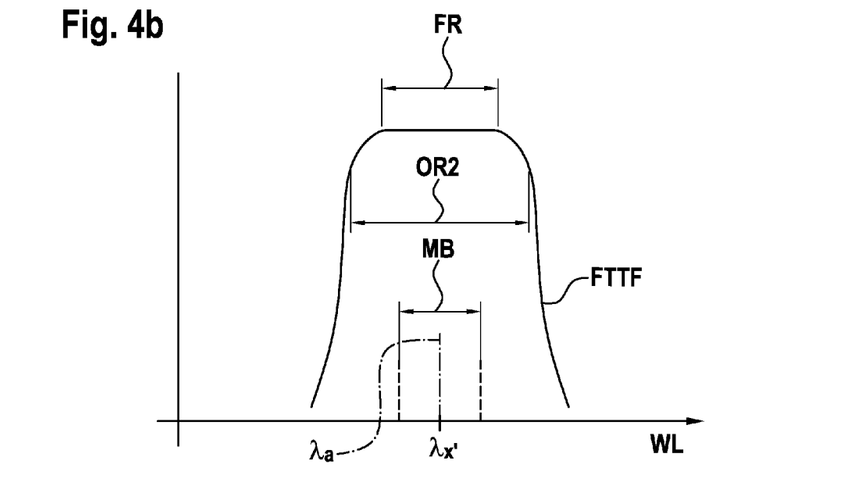
FIG. 4b shows a transfer function of flat-top shaped optical filter.

The upstream signals forming an overall upstream signal may be amplified by an optical amplifier OA for compensating for insertion loss values caused by the different optical filters M1, OM2. A splitting unit SU is used for splitting the overall upstream signal onto two different optical de-multiplexing filters OM1, OM2. The filter OM2 is a de-multiplexing filter having for respective wavelengths $\lambda_a$, $\lambda_b$, . . . respective transfer functions with a flat-top shape as shown in FIG. 4b. Preferably, the filter OM2 is given by an AWG as previously described. Even more preferably, the filter OM2 is given by a cyclic AWG as previously described. The filter OM2 has a set of respective transfer functions whose respective center wavelengths are essentially equal to the center wavelengths of the transfer functions given by the filter OM1.

The filtered signals filtered by the filter OM2 are provided to respective receivers OLTRX'.

Figure 7:
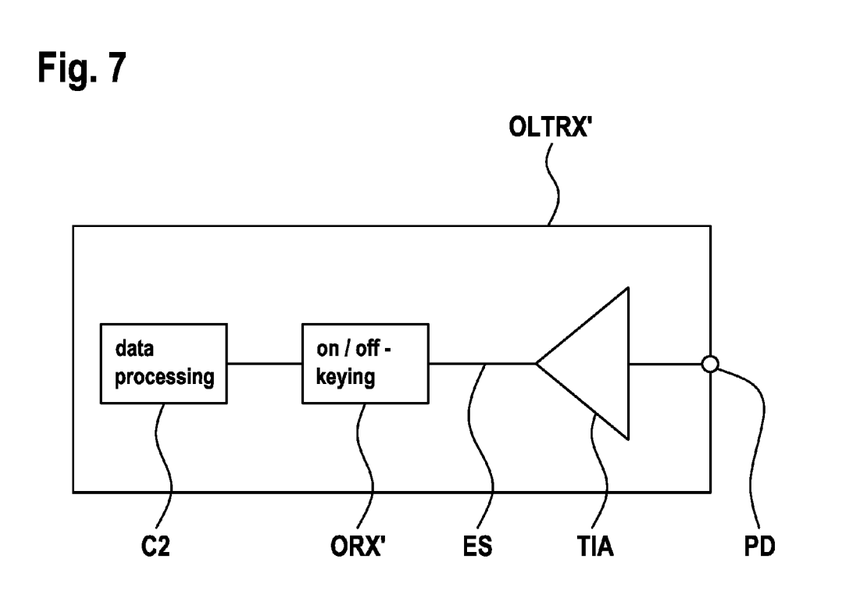
FIG. 7 shows a date reception unit of the proposed optical line terminal.

FIG. 7 shows a receiver OLTRX' in more detail. The receiver OLTRX' differs from the receiver OLTRX shown in FIG. 3, in that the receiving unit ORX' in contrast to the receiving unit ORX of FIG. 3 does not perform power level detection.

The overall upstream signal reaching the filter OM1 is filtered by respective transfer functions having a transfer function with a shape as described with regard to FIG. 4a. The filtered signals yielded by filtering the overall upstream signal with the transfer functions of the filter OM1 are then provided to respective power level detection units PDU.

A power level detection unit PDU contains a photodiode PD1, which yields an electrical signal that is converted to a digital signal at an analog-digital converter ADC. A power level detector PDT, which may be a processing unit or a control unit, determines a power level of the converted electrical signal, wherein this power level corresponds to the optical signal's power level obtained from the filtered signal filtered by the optical filter OM1. This determined optical power level is then provided via a digital analog converter DAC as an electrical signal ES1. The signal ES1 indicates the received optical signal power of the filtered signal after the filter OM1. In other words, the signal ES1 is an electrical signal that is proportional to the optical power of the signal filtered by the filter OM1.

The electrical signal ES1 is provided to a control unit CU1, which is a media access control unit as previously described with regard to FIG. 1. The control unit CU1 then initiates an indication of a desired direction of wavelength shift via the transmission unit TX in dependence on the derived optical signal power level as previously described above with the regard to the tuning process of the ONU's transmission wavelength.

The advantage of the proposed optical line terminal OLT1 becomes evident when comparing a filter with a transfer function having a shape as described with regard to FIG. 4a and a filter with a flat-top shaped transfer function shown in FIG. 4b. The transfer functions GTF and FTTF of the different filters are essentially equal in their center wavelength. Within FIG. 4a, and optical range OR1 is indicated within which an attenuation of maximally 1 dB is caused by the transfer function GTF. A corresponding optical range with such a maximal attenuation of 1 dB is shown as the optical range OR2 within FIG. 4b for the flat-top shaped transfer function FTTF. For the flat-top transfer function FTTF, the 1 dB range is approximately twice the size of the optical 1 dB range OR1 of the transfer function GTF of FIG. 4a. Since an amplitude modulated upstream signal does not consist only of a center wavelength as a single wavelength $\lambda_a$, but is rather a bandwidth signal with a resulting modulation bandwidth MB around its wavelength $\lambda_a$ as shown in FIG. 4b, the flat-top filter transfer function FTTF of FIG. 4b causes less overall attenuation on such an upstream signal in comparison to the transfer function GTF of FIG. 4a. For example, the 1 dB bandwidth for a Gaussian filter when using a grid spacing of 50 GHz is approximately 0.1 nanometers, wherein this 1 dB bandwidth is for a flat-top shaped filter approximately 0.2 nanometers.

A wavelength accuracy of filters with a Gaussian shape or flat-top shape is usually similar within a range of approximately 0.02 nanometers or less. Although a flat-top shaped filter may have an insertion loss of up to 9 dB in comparison to an insertion loss of up to 6 dB for a Gaussian shaped filter, such a higher insertion loss for the flat-top shaped filter may be compensated by the amplifier OA within the line terminal OLT1 shown in FIG. 5.

Clearly, using a flat-top shaped filter OM2 of FIG. 5 for the purpose of data reception may lead to an improved data reception in comparison to using as the filter OM2 of FIG. 5 a filter with a transfer function as shown in FIG. 4a due to less signal attenuation.

On the other hand, due to the fact, that the transfer function FTTF of the flat-top shaped filter as shown in FIG. 4b does not strictly monotonically increase below its center wavelength $\lambda_{x'}$ and does also not monotonically decrease above its center wavelength $\lambda_{x'}$ but instead comprises a so called flat region FR within which almost no change of the transfer function FTTF can be detected, this may be cumbersome to use in the previously mentioned tuning process. Due to the fact, that for different time instances respective received optical signal power levels may be determined, the tuning process may not necessarily converge to an upstream transmission wavelength that is equal to or close to the center wavelength $\lambda_{x'}$. This is rather the case, when filtering the received upstream signal with a filter having a transfer function as shown in FIG. 4a. Therefore, using within the optical line terminal OLT1 of FIG. 5 a filter having a transfer function as shown in FIG. 4a as the filter OM1 for optical power level detection and a flat top shaped filter OM2 for data reception, the respective advantages can be achieved in combination.

Furthermore, the amount by which the signal level decreases beyond the 1 dB region OR2 is larger for the flat-top shaped filter shown in FIG. 4b than beyond the 1 dB region OR1 of a filter having a transfer function as shown in FIG. 4a. Thus, when tuning the upstream wavelength, the received and filtered signal power used for power level detection may decrease more dramatically when filtering the upstream signal with the flat-top shaped filters transfer function of FIG. 4b than when filtering the upstream signal with the filter a having a transfer function as shown in FIG. 4a.

The proposed line terminal OLT1 achieves two advantages firstly, reduced attenuation of the received upstream signal over the whole modulation band width MB for data reception within the receiver OLTRX', and secondly, ensuring a convergence of the ONU's wavelength in the tuning process.

Preferably, the filter OM1 and the filter OM2 are provided on a same substrate in order to maximize wavelength matching of the filters' center wavelength.

To summarize the proposed invention, the line terminal OLT1 provided herein has a data path that is separate from the control path for controlling the wavelength of the upstream signal. Thus, the receiver at the line terminal OLT1 is more robust to wavelength drift and may preferably allow to work with a smaller grid of 50 GHz instead of 100 GHz.

The functions of the various elements shown in the figures, including any functional blocks labeled as 'control units', 'controllers', 'processors', processing units' or 'units', may be provided through the use of dedicated hardware as well has hardware capable of executing software in association with appropriate software. When provided by a processor, the function may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A method of receiving a wavelength-division multiplexed (WDM) optical upstream signal in an optical access network, wherein said WDM optical upstream signal is an overall upstream signal comprising a plurality of optical upstream signals having respective wavelengths, and said plurality of optical upstream signals are modulated via amplitude modulation, the method comprising, at an optical line terminal (OLT):

splitting said WDM optical upstream signal onto a first optical de-multiplexing filter and a second optical de-multiplexing filter, filtering said WDM optical upstream signal using said first optical de-multiplexing filter yielding a first filtered signal, wherein said first optical de-multiplexing filter has a flat-top shaped pass-band transfer function, filtering said WDM optical upstream signal using said second optical de-multiplexing filter yielding a second filtered signal, wherein said second optical de-multiplexing filter has a Gaussian shaped pass-band transfer function that is strictly monotonically increasing for wavelength values below a center wavelength and that is strictly monotonically decreasing for wavelength values above said center wavelength, deriving, from said first filtered signal, received upstream data, and carrying out an iterative wavelength tuning process including, deriving, from said second filtered signal, a first optical signal power level for a first time interval and a second optical signal power level for a second time interval, wherein the first and second optical signal power levels relate to the Gaussian shaped pass-band transfer function, detecting whether a wavelength of an optical network unit (ONU) at the second time interval has drifted away from said center wavelength based on comparing the first and second optical signal power levels, wherein the wavelength of the ONU at the first time interval coincides with said center wavelength, determining a direction and amount of wavelength shift based on the first and second optical signal power levels in response to detecting that the wavelength of the ONU has drifted away from said center wavelength, transmitting, to the ONU, an optical downstream signal including a data element indicating the direction and amount of wavelength shift to be performed by the ONU, deriving, from said second filtered signal, a third optical signal power level for a third time interval, and determining whether to maintain or change the direction of the wavelength shift based on comparing the third optical signal power level with the first and second optical signal power levels, wherein the iterative wavelength tuning process enables convergence of the wavelength of the ONU towards said center wavelength.

2. The method according to claim 1, wherein said flat-top shaped pass-band transfer function of said first optical de-multiplexing filter and said Gaussian shaped pass-band transfer function of said second optical de-multiplexing filter are essentially equal in their respective center wavelengths.

3. The method according to claim 1,
wherein said amplitude modulation is on-off keying modulation.

4. The method according to claim 1, wherein the determining whether to maintain or change the direction of the wavelength shift includes,
determining to maintain the direction of the wavelength shift in response to a difference between the third optical signal power level and the first optical signal power level being less than a difference between the second optical signal power level and the first optical signal power level, and
determining to change the direction of the wavelength shift in response to the difference between the third optical signal power level and the first optical signal power level being greater than the difference between the second optical signal power level and the first optical signal power level.

5. An optical line terminal (OLT) for receiving a wavelength-division multiplexed (WDM) optical upstream signal in an optical access network, wherein said WDM optical upstream signal is an overall upstream signal comprising a plurality of optical upstream signals having respective wavelengths, and said plurality of optical upstream signals are modulated via amplitude modulation, said OLT comprising:
a memory configured to store computer-readable instructions; and
a processor configured to execute the computer-readable instructions to cause the OLT to,
split said WDM optical upstream signal onto a first optical de-multiplexing filter and a second optical de-multiplexing filter,
filter said WDM optical upstream signal, using said first optical de-multiplexing filter yielding a first filtered signal, wherein said first optical de-multiplexing filter has a flat-top shaped pass-band transfer function,
filter said WDM optical upstream signal, using said second optical de-multiplexing filter yielding a second filtered signal, wherein said second optical de-multiplexing filter has a Gaussian shaped pass-band transfer function that is strictly monotonically increasing for wavelength values below a center wavelength and that is strictly monotonically decreasing for wavelength values above said center wavelength,
derive, from said first filtered signal, received upstream data, and
carry out an iterative wavelength tuning process including,
deriving, from said second filtered signal, a first optical signal power level for a first time interval and a second optical signal power level for a second time interval, wherein the first and second optical signal power levels relate to the Gaussian shaped pass-band transfer function,
detecting whether a wavelength of an optical network unit (ONU) at the second time interval has drifted away from said center wavelength based on comparing the first and second optical signal power levels, wherein the wavelength of the ONU at the first time interval coincides with said center wavelength,
determining a direction and amount of wavelength shift based on the first and second optical signal power levels in response to detecting that the wavelength of the ONU has drifted away from said center wavelength,
transmitting, to the ONU, an optical downstream signal including a data element indicating the direction and amount of wavelength shift to be performed by the ONU,
deriving, from said second filtered signal, a third optical signal power level for a third time interval, and
determining whether to maintain or change the direction of the wavelength shift based on comparing the third optical signal power level with the first and second optical signal power levels,
wherein said iterative wavelength tuning process enables convergence of the wavelength of the ONU towards said center wavelength.

6. The optical line terminal according to claim 5, wherein said flat-top shaped pass-band transfer function of said first optical de-multiplexing filter and said Gaussian shaped pass-band transfer function of said second optical de-multiplexing filter are essentially equal in their center wavelengths.

7. The optical line terminal according to claim 5, wherein the determining whether to maintain or change the direction of the wavelength shift includes,
determining to maintain the direction of the wavelength shift in response to a difference between the third optical signal power level and the first optical signal power level being less than a difference between the second optical signal power level and the first optical signal power level, and
determining to change the direction of the wavelength shift in response to the difference between the third optical signal power level and the first optical signal power level being greater than the difference between the second optical signal power level and the first optical signal power level.

* * * * *